United States Patent [19]
Kato et al.

[11] Patent Number: 5,293,627
[45] Date of Patent: Mar. 8, 1994

[54] METHOD FOR ADJUSTING CURENT CLOCK COUNTS IN A DISTRIBUTED COMPUTER SYSTEM

[75] Inventors: Nobuhiro Kato; Yojiro Morimoto; Miho Muranaga; Koichi Sekiguchi, all of Kanagawa, Japan

[73] Assignee: Kabushiki Kaisha Toshiba, Tokyo, Japan

[21] Appl. No.: 704,581

[22] Filed: May 22, 1991

[30] Foreign Application Priority Data

May 23, 1990 [JP] Japan ................. 2-131171

[51] Int. Cl.$^5$ ............................................. G06F 13/00
[52] U.S. Cl. ..................... 395/550; 395/200; 395/575; 364/282.1; 364/282.3
[58] Field of Search ......................... 395/550, 575, 200; 364/282.1, 282.3

[56] References Cited

U.S. PATENT DOCUMENTS

| | | | |
|---|---|---|---|
| 4,530,054 | 7/1985 | Hamstra et al. | 395/550 |
| 4,725,834 | 2/1988 | Chang et al. | 364/200 |
| 4,807,224 | 2/1989 | Naron et al. | 364/200 |
| 4,974,166 | 11/1990 | Maney et al. | 364/468 |
| 5,210,824 | 5/1993 | Putz et al. | 395/145 |

FOREIGN PATENT DOCUMENTS 59-55553 3/1984 Japan .

Primary Examiner—Arthur G. Evans
Assistant Examiner—D. E. Smith
Attorney, Agent, or Firm—Finnegan, Henderson, Farabow, Garrett & Dunner

[57] ABSTRACT

A method for adjusting current clock counts in a distributed database apparatus is accomplished. Each processor assigns a timestamp to a transaction according to its clock when the transaction is generated, and transaction are executed by accessing the database according to timestamp order. A processor in at least a first one of the computer sites accesses an abort count corresponding to a second computer site; compares an abort count corresponding to the first computer site with the abort count corresponding to the second computer site; and changes the current clock count corresponding to the first computer site to more closely match the current clock count corresponding to the second computer site, at times when the comparison between the abort counts in the first and second computer sites indicates that new transactions have been aborted more frequently in one of the two computer sites.

18 Claims, 7 Drawing Sheets

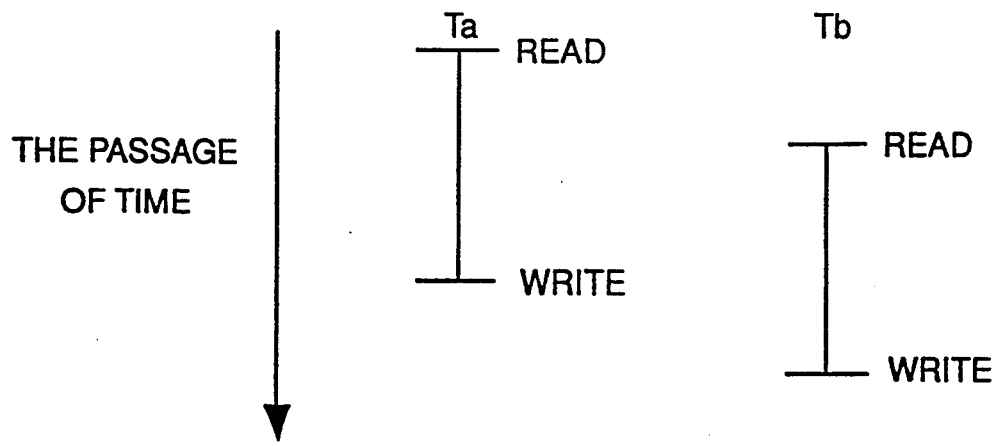
FIG. 1 (PRIOR ART)
| OPERATION | READ |
|---|---|
| RECORD KEY | 100 |
| TABLE NAME | ACCOUNT |
FIG. 2
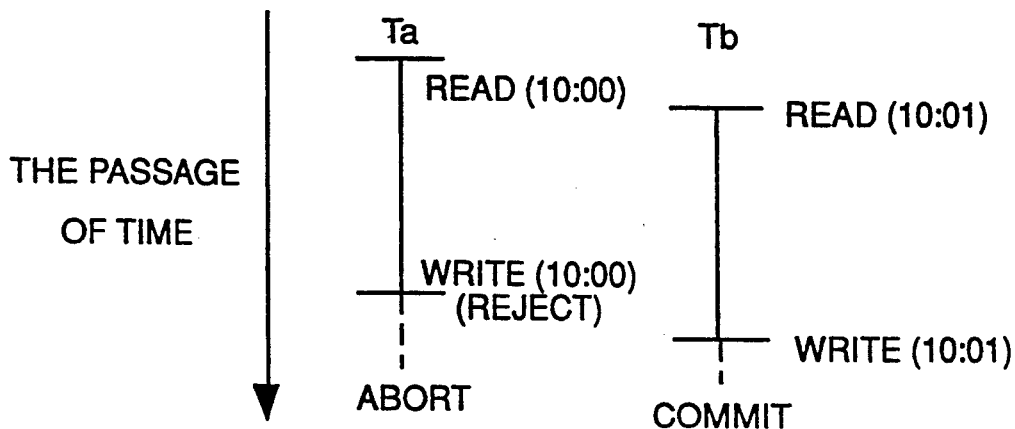
FIG. 3A (PRIOR ART)

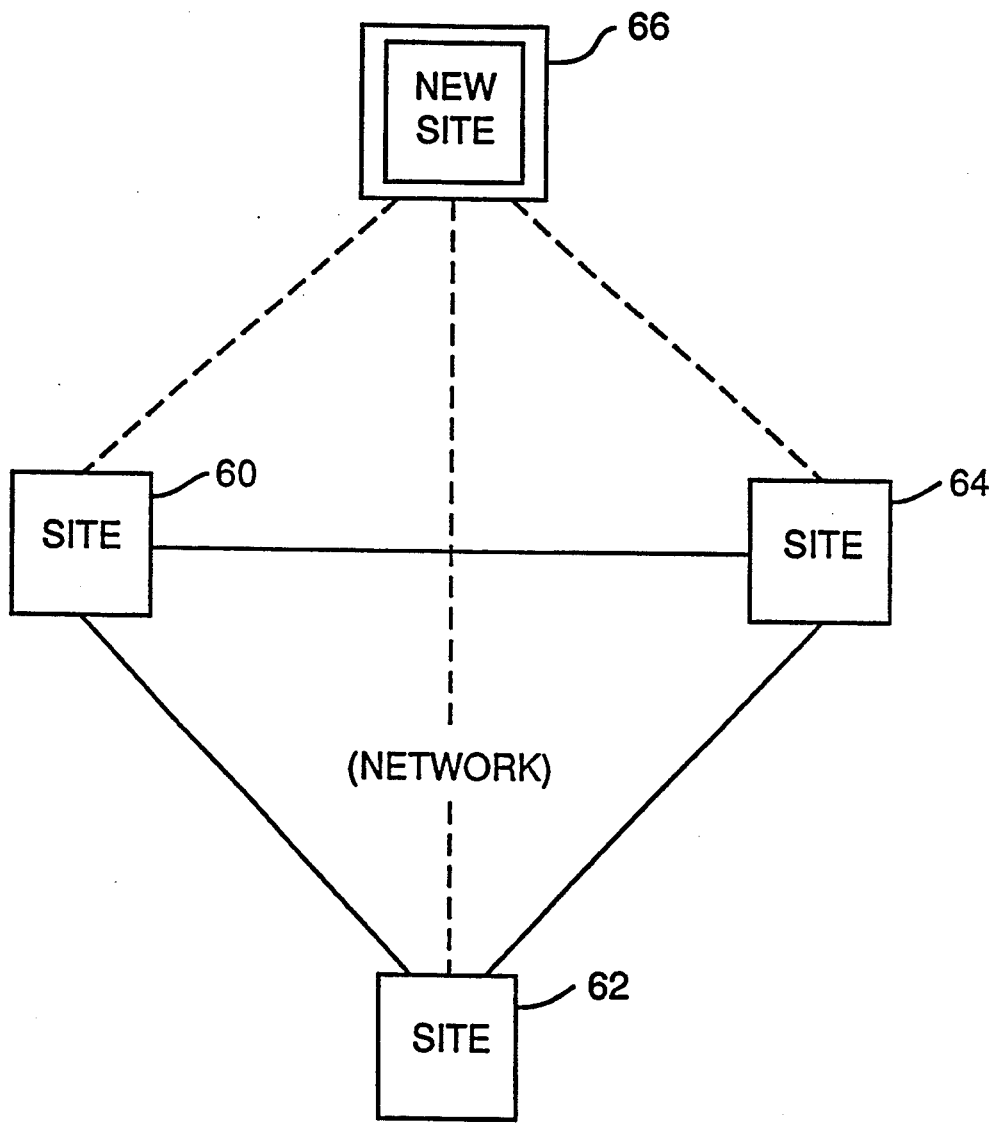
FIG. 6 *(PRIOR ART)*

METHOD FOR ADJUSTING CURENT CLOCK COUNTS IN A DISTRIBUTED COMPUTER SYSTEM

BACKGROUND OF THE INVENTION

1. Field of the Invention

The present invention relates to a method for adjusting current clock counts for each computer site in a distributed computer system to effectively execute timestamped transactions.

2. Description of the Background

A distributed computer system comprises a number of computer sites, each of which has a processor and stores a database in a disk. The computer sites are interconnected by a network of communication lines. When a site receives a data processing request from a user, a processor in the site determines which database in the system includes the necessary data for processing by referring to a system catalog that stores information for data location. If the necessary data is stored in the database of the same computer site as the processor, the processor reads the necessary data from its database, executes data processing operations on the data, and writes the result into the database. A series of these processes is referred to as a transaction. If the necessary data is stored in a database at another computer site, the processor sends a request to read the necessary data from the database to the other computer site using the communication lines of the network. A processor of the other computer site reads the data from its database and sends the data to the computer site which sent the request using the communication lines. Then the processor of the computer site executes data processing operations on this data.

FIG. 1 shows an example of two transactions which access the same data entry. It is assumed that the computer site corresponds to a branch of a bank, and the database stores data entries (records) representing the balance deposit for each of the bank's customers. When money is deposited or withdrawn from an account at any branch, a transaction must be performed by the computer system. During the transaction, the balance in the customer's account is read from a database, the money that is newly deposited or withdrawn by the customer or the bank is added to or subtracted from the balance for that customer, and the arithmetic result is written back into the data entry (record) in the database that corresponds to the account for that customer.

In this example, a data entry in the database at computer site A stores a customer's balance. It is assumed that the customer's beginning balance is $50. At computer site A, an additional $100 is deposited in the customer's account by a transaction that will be designated Ta. Immediately after, at another computer site B, $30 is deposited in that same account by another transaction that will be designated Tb. Under these circumstances, a processor at computer site A will execute a READ operation for transaction Ta. The processor will add $100 to the beginning balance of $50, and then writes $150 into the database as the new balance in the account during a WRITE operation for transaction Ta. However, a processor at computer site B may send a request for a READ operation for transaction Tb to computer site A, and the processor at computer site A execute the READ operation before execution of the WRITE operation for transaction Ta. As a result, the processor at computer site B will read the customer's beginning balance of $50. Then, the processor at computer site B adds $30 to the beginning balance of $50, and sends $80 as a request for a WRITE operation to computer site A. The processor at computer site A writes $80 into the database as the customer's new balance during a WRITE operation for transaction Tb. Therefore, the data entry in the database for this customer's account will indicate an ending balance of $80. However, the ending balance in this customer's account is actually $180.

To prevent such errors, a concurrency control mechanism is used, i.e. a timestamp method. According to this method, each computer site has its own clock. When a request is made to initiate a transaction, the computer site assigns a timestamp to the new transaction. Preferably, the timestamp includes a transaction clock count that corresponds to a current clock count for the computer site at that time. For example, if a customer deposits $100 at an automatic teller machine (ATM), a transaction request is generated by the computer site where the ATM is located in order to add $100 to the customer's account. This computer site determines the computer site corresponding to the customer's account by examining a key recorded on the customer's cash card. The computer site also examines a current clock count for the site that is provided by its clock and clock register. The computer site will generate a transaction request, consisting of a operation (READ), a record key (100), and a table name (ACCOUNT), as shown in FIG. 2.

FIGS. 3A and 3B show an example of two transactions that access the same data entry and timestamp table according to a timestamp method. It is assumed that computer site A and computer site B each have a clock and clock register that generate an accurate current clock count. When a transaction request is made by a customer or computer user at a branch corresponding to computer site A, computer site A assigns a transaction clock count and a computer site identifier to the transaction Ta. In this example, the current clock count is 10:00 and the identifier of the computer site is (A). As a result, computer site A assigns a timestamp 10:00 (A) to the transaction Ta, and will subsequently write this timestamp into the read timestamp field of the timestamp table corresponding to the customer's account when the transaction Ta reads data from the record. In this example, the write timestamp 0:00 is read out from timestamp table as shown in upper of FIG. 3B. The timestamp 10:00 (A) is larger than the write timestamp 0:00. Therefore, the transaction Ta reads data from the record and writes the timestamp 10:00 (A) in the read timestamp field to the timestamp table as shown in middle of FIG. 3B.

FIG. 4 shows the data structure of a timestamp table and corresponding database (table account). The timestamp table is previously stored in memory different from database. The timestamp table consists of a record key, a read timestamp, and a write timestamp. The database consists of a key, a name, a data entry. In this example, the data entry is balance deposit because this database is table account. Each item of the timestamp table corresponds to item of the database according to the key. For example, Mike's balance deposit was read and written by a transaction generated by computer site A at 10:00.

Immediately after computer site A requests a transaction, another transaction may be made at the branch corresponding to computer site B. Computer site B assigns the current timestamp 10:01 (B) to the new transaction Tb if the current clock count at computer site B is 10:01 when the transaction request is generated. When computer-site B sends a request of a READ operation to computer site A and the computer site A reads the data entry by record key 100, the write timestamp 0:00 corresponding to the record key 100 is read out. The timestamp 10:01 (B) is larger than the write timestamp 0:00. Therefore, the transaction Tb reads data from the record and writes the timestamp 10:01 (B) in the read timestamp field of the timestamp table as shown in lower of FIG. 3B. When transaction Ta writes execution result to the record, the read timestamp 10:01 (B) is read out from the timestamp table. The timestamp 10:00 (A) of transaction Ta is smaller than the read timestamp 10:01 (B). Therefore, write processing of transaction Ta is reject. Then, transaction Ta is aborted in computer site A. When transaction Tb writes execution result to the record, the read timestamp 10:01 (B) is read out from the timestamp table. The timestamp 10:01 (B) of transaction Tb is not smaller than the read timestamp 10:01 (B). Therefore, write processing of transaction Tb is accepted. Then, transaction Tb is committed (succeeded) in computer site B. (Transaction Ta is assigned larger timestamp and executed again.)

Unfortunately, the current clock counts in different computer sites are not always accurate and are not always the same. Even if the current clock counts in different computer sites are identical same during an initialization mode, as time progresses, the difference in the current clock counts of two computer sites will become larger and larger.

FIGS. 5A and 5B show an example of the attempted execution of two transactions by two computer sites that have different current clock counts and timestamp table. In this example, the current clock count of computer site A is early when compared to the current clock count of computer site B, and the current clock count of computer site B is late or delayed when compared to the current clock count of computer site A.

In this example, when a transaction request Ta is made at the branch corresponding to computer site A, computer site A assigns a transaction clock count 10:00 and an identifier (A) to the transaction request. Preferably, transaction clock count 10:00 corresponds to the current clock count at computer site A. Immediately thereafter, a transaction request Tb is made at the branch corresponding to computer site B, and computer site B assigns a transaction clock count 9:55 and an identifier (B) to the transaction request. The transaction clock count 9:55 corresponds to the current clock count at computer site B, which is late when compared with the current clock count at computer site A.

When computer site A executed a READ operation according to the transaction Ta, timestamp 10:00 (A) is written in read timestamp field of timestamp table as shown in upper of FIG. 5B. This processing is the same as that shown in FIG. 3A. When computer site A executes a READ operation according to the transaction Tb, write timestamp 0:00 is read out from timestamp table. The timestamp 9:55 (B) is larger than the write timestamp 0:00. Therefore, computer site A read the data entry by record key 100 and write the timestamp 9:55 (B) in read timestamp field as shown in the middle of FIG. 5B. When computer site A writes execution result of transaction Ta to the record, the read timestamp 9:55 (B) is read out from timestamp table. The timestamp 10:00 (A) is larger than the read timestamp 9:55 (B). Therefore, computer site A executes a WRITE operation and writes the timestamp 10:00 (A) in write timestamp field of timestamp table as shown in the lower of FIG. 5B. Then, transaction Ta is committed in computer site A as shown in FIG. 5A. When computer site A writes execution result of transaction Tb to the record, the read timestamp 9:55 (B) and write timestamp 10:00 (A) is read out from timestamp table. The timestamp 9:55 (B) is not smaller than the read timestamp 9:55 (B), but it is smaller than the write timestamp 10:00 (A). Therefore, write processing of transaction Tb is rejected. After transaction Tb is aborted, the current clock count for computer site B may be 10:01. In this situation, it is preferable for computer site B to write a new transaction clock count of 10:01 into the data structure corresponding to transaction request Tb. As a result, a new timestamp 10:01 (B) is assigned to transaction Tb.

Now, if computer site A again attempts to execute a READ operation according to transaction Tb, transaction Tb will not be aborted because the write timestamp 10:00 (A) is smaller than timestamp 10:01 (B) assigned to transaction Tb. See FIG. 3.

Thus, if one computer site executing a new transaction attempts to execute a READ operation on the database at a particular record key, but the read/write timestamp corresponding to the data entry is later than the timestamp assigned to the new transaction, then the computer site must abort the new transaction. As the difference in current clock counts between different computer sites becomes larger, the number of transactions that must be aborted by the computer site with the late current clock count increases.

To address this problem, a method for adjusting current clock counts is disclosed in Japanese Patent Disclosure (Kokai) P59-5553. FIG. 6 shows a distributed system computer taught by this reference. In FIG. 6, three computer sites 60, 62, and 64 already are interconnected by a network, and a new computer site 66 is being connected in the network.

As disclosed in Japanese Patent Disclosure (Kokai) P59-55553, new computer site 66 inquires about the current clock counts provided by the clocks and clock registers in existing computer sites 60, 62, and 64. When new computer site 66 receives information indicating the current clock counts of each of the existing computer sites, a clock offset OFS is calculated. The clock offset OFS is the amount of time that the current clock count corresponding to new computer site 66 will be advanced (i.e., the clock is made early rather than late).

In a distributed computer system of the type disclosed in Japanese Patent Disclosure (Kokai) P59-55553, the clock offset OFS is calculated by new computer site 66 by first selecting the current clock count from all of the computer sites that corresponds to the clock that is the fastest (e.g., 10:05 is selected instead of 10:00). Then, a clock offset OFS is added to the current clock count of new computer site 66 that will make its current clock count identical to the current clock count of the computer site with the fastest (i.e., earliest) clock. This process of calculating a clock offset OFS is repeated whenever a new computer site is connected to the network.

However, when using the method disclosed in Japanese Patent Disclosure (Kokai) P59-55553, it is difficult to accurately adjust the current clock count of the new computer site. Information indicating the current clock counts of each of the existing computer sites is received by new computer site 66 only after a communication delay, and this communication delay must be estimated correctly to determine the amount of time that the current clock count corresponding to new computer site 66 should be advanced.

Moreover, the method disclosed in Japanese Patent Disclosure (Kokai) P59-55553 does not provide any method for adjusting the current clock counts of existing computer sites. As time passes, the differences between the current clock counts of these computer sites will increase.

SUMMARY OF THE INVENTION

It is an object of the invention to overcome at least some of the problems associated with the prior art.

It is therefore desirable to provide an improved method for adjusting current clock counts in a distributed computer system. It would be beneficial to provide a process in which the current clock count corresponding to one computer site is changed to more closely match the current clock count corresponding to another computer site.

Additional objects and advantages of the invention will be set forth in part in the description which follows, and in part will be obvious from the description, or may be learned by practice of the invention. The objects and advantages of the invention may be realized and obtained by means of the instrumentalities and combinations particularly pointed out in the appended claims.

To achieve the objects and in accordance with the purposes of the invention, as embodied and broadly described herein, a method is provided for adjusting current clock counts in a distributed computer system. The distributed computer system includes a number of computer sites, each computer site including a processor, a memory having a number of record keys for storing timestamp table, a database, an abort register for storing an abort count corresponding to the computer site, a clock for generating a clock signal indicating the passage of time, and a clock register responsive to the clock signal for storing a current clock count corresponding to the computer site. The database for each computer site includes a number of data entries (records) that correspond t the record key and that can be accessed by a processor. Each record key corresponds to timestamp which includes at least clock count that indicates when the corresponding data entry in the corresponding record key was most recently accessed. The distributed computer system also includes a network for interconnecting the computer sites to enable a processor in one computer site to send the data entries and request for accessing in another computer site.

The method includes the following steps, which are executed by a processor in at least a first one of the computer sites: assigning a timestamp to a new transaction that is related to the current clock count for the first computer site, at times when the processor in the first computer site is initiating the new transaction; reading the timestamp corresponding to the record key from the memory, at times when the processor in the first computer site is initiating the new transaction; comparing an existing timestamp corresponding to the record key with the timestamp assigned to the new transaction; aborting the new transaction, at times when the timestamp assigned to the new transaction is smaller than the existing timestamp corresponding to the record key; incrementing the abort count corresponding to the first computer site, at times when the new transaction is aborted, to indicate the number of times that new transactions initiated by the first computer site have been aborted; accessing an abort count corresponding to a second computer site; comparing the abort count corresponding to the first computer site with the abort count corresponding to the second computer site; and changing the current clock count corresponding to the first computer site to more closely match the current clock count corresponding to the second computer site, at times when the comparison between the abort counts in the first and second computer sites indicates that new transactions have been aborted more frequently in one of the two computer sites.

The accompanying drawings, which are incorporated in and constitute a part of this specification, illustrate preferred embodiments of the invention and, together with the description of the invention, explain the principles of the invention.

BRIEF DESCRIPTION OF THE DRAWINGS

FIG. 1 shows a prior art example of the execution of two transactions involving the same database.

FIG. 2 shows the data structure of a transaction request.

FIGS. 3A and 3B show a prior art example of the execution of two transactions involving the same database and using timestamps.

FIGS. 5A and 5B show a prior art example of the execution of two transactions involving the same database and using timestamps.

FIG. 6 shows a prior art example of a distributed computer system.

DESCRIPTION OF THE PREFERRED EMBODIMENTS

Figure 7:
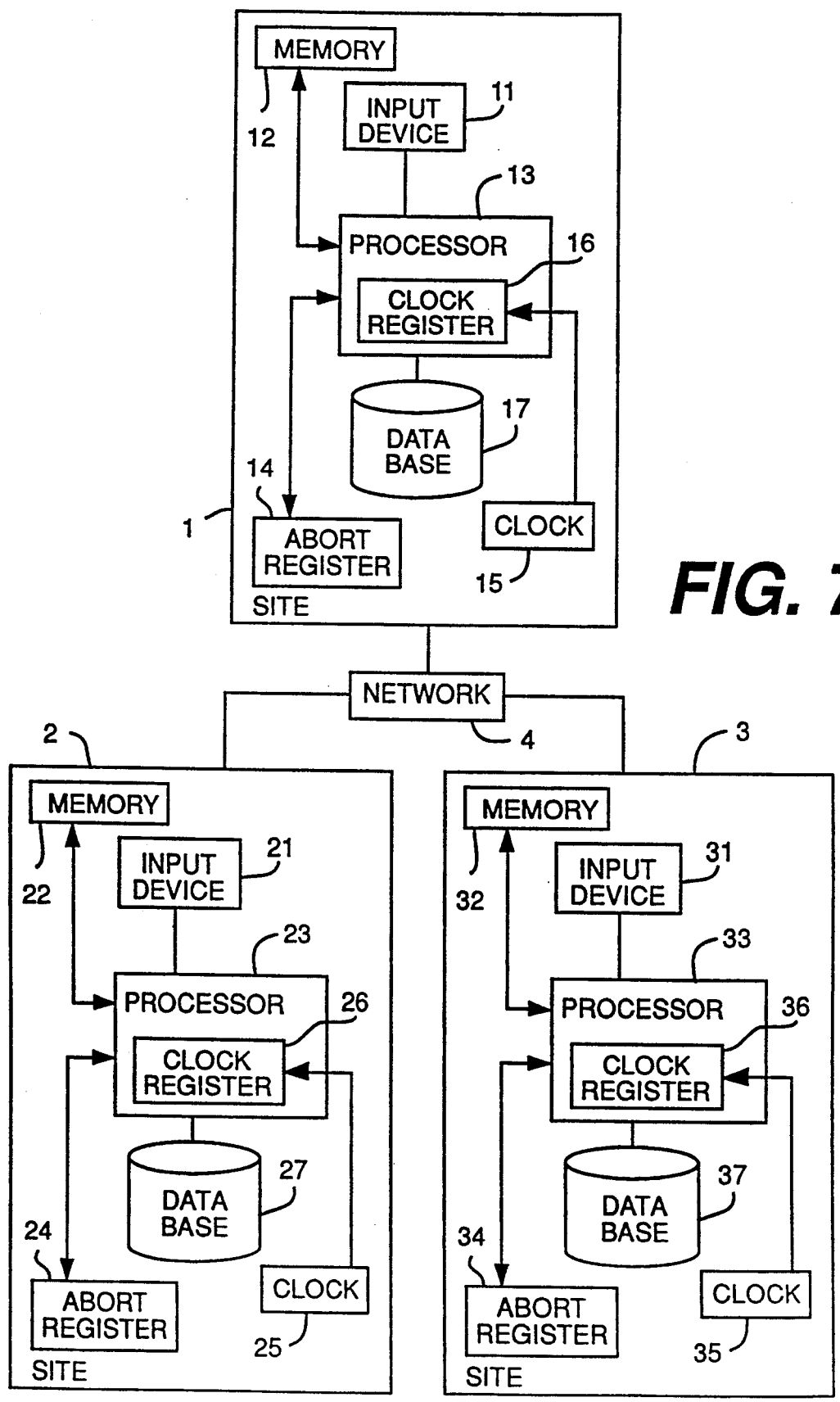
FIG. 7 shows a block diagram of computer sites in a distributed computer system.

FIG. 7 shows a distributed computer system. The distributed computer system includes three computer sites 1, 2, and 3. The computer sites are interconnected by a network 4.

Computer sites 1, 2, and 3 respectively include input devices 11, 21, and 31, which can be operated by a computer site user or a customer to request that a new transaction be initiated, memories 12, 22, and 32 for storing timestamp table and system catalog, processors 13, 23, and 33 for executing transactions, abort registers 14, 24, and 34 for storing an abort count corresponding to the computer site, clocks 15, 25, and 35 for generating a clock signal indicating the passage of time, clock registers 16, 26, and 36 that are responsive to the clock signal for storing a current clock count corresponding to the computer site, and databases 17, 27, and 37 for storing a plurality of data entry.

When the distributed computer system is in operation, a customer or computer user located at computer site 1 will request that a new transaction be initiated using input device 11. Processor 13 in computer site 1 is coupled to input device 11, and responds to the request by generating a transaction request that will be designated T1 to distinguish it from transaction requests generated by processors 23 and 33 in computer sites 2 and 3. The transaction request includes an operation (e.g., add, subtract), a record key, and a data (e.g., an amount to be deposited or withdrawn from a checking account). This information contained in the transaction request is typically supplied to processor 13 by the customer or computer user located at computer site 1 that requested initiation of new transaction T1.

In accordance with the invention, processor 13 assigns a timestamp to the new transaction T1 that is related to the current clock count for computer site 1, at times when processor 13 in computer site 1 is initiating the new transaction. Preferably, processor 13 assigns a timestamp $t_s$ (T1) to transaction T1 that has a transaction clock count that matches the current clock count stored in clock register 16 of computer site 1. As embodied herein, the timestamp also includes a site identifier. As a result, even if processors at two different computer sites generate separate transaction requests at the same time, the timestamps assigned to any two transactions will be different.

Figures 3B, 5A, 5B:
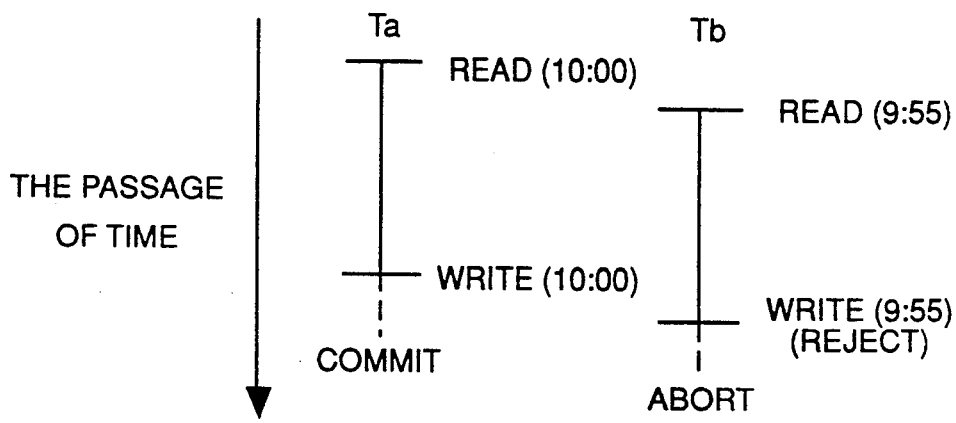
Figure 4:
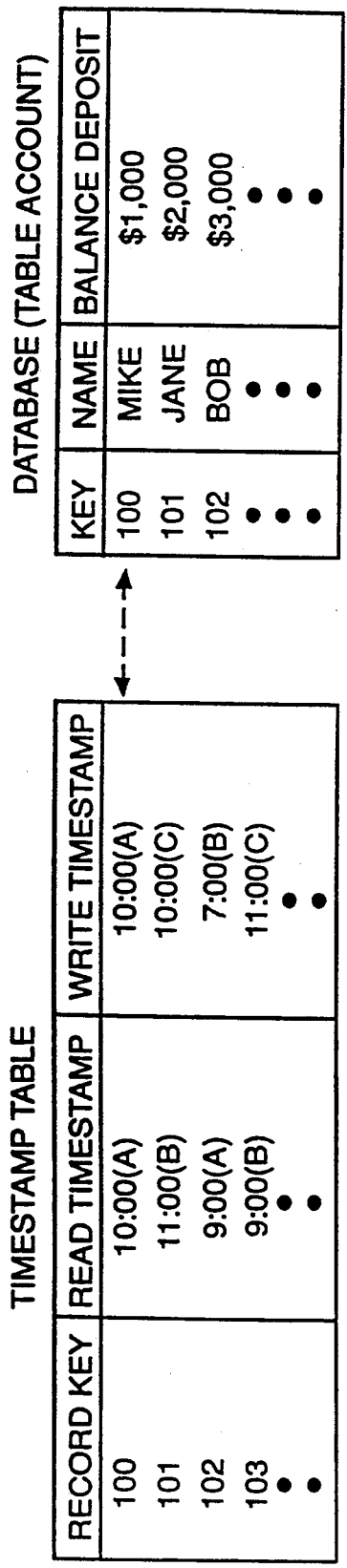
FIG. 4 shows the data structure of a timestamp table and a database.
Figure 8:
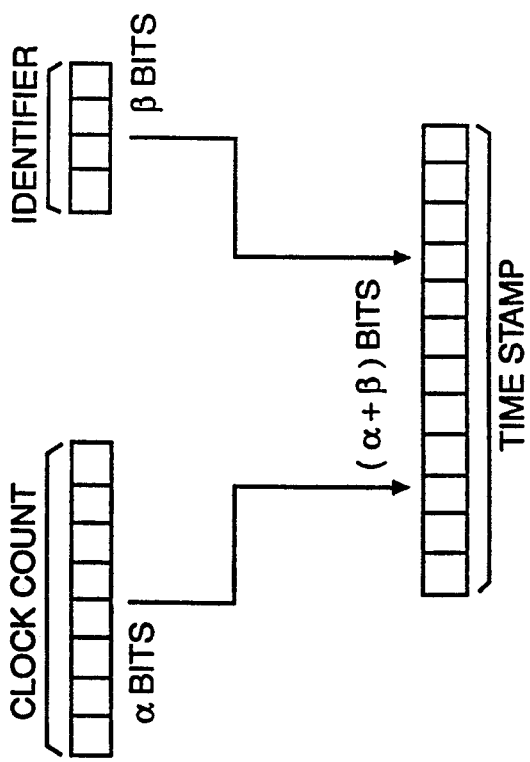
FIG. 8 shows the data structure of a timestamp.

FIG. 8 shows the data structure of a timestamp. The timestamp consists of "α" most significant bits for storing time when transaction is generated, and "β" least significant bits for storing an identifier that indicates in which site the transaction is generated. "β" must be large enough so that $2^\beta$ is not less than the total number of computer sites.

In accordance with the invention, a processor in a computer site will read the timestamp from the memory according to the record key, at times when the processor is initiating a new transaction. Next, the processor will compare the timestamp corresponding to the record key with the timestamp assigned to the new transaction. The processor will access the data entry (record) from the database according to the record key, at times when the timestamp assigned to the new transaction is larger than the timestamp corresponding to the record key. This processing is already explained in the Description of the Background.

As an example of the operation of a preferred embodiment of the invention, it is assumed that input device 21 requests that a new transaction T2 be initiated by processor 23 in computer site 2 almost the same time that transaction T1 is being initiated by processor 13 in computer site 1. Processor 23 generates a transaction request T2 and assigns a timestamp $t_s$(T2) to transaction T2 in accordance with the current clock count stored in clock register 26 and the identifier of computer site 2.

In this example, it is assumed that transaction T1 and transaction T2 access the same data entry in the same database, i.e., the database 37 in computer site 3, and that clock 15 and clock register 16 are late when compared with clock 25 and clock register 26. As a result, the current clock count assigned to transaction requests generated by processor 13 in computer site 1 will be late (e.g., 9:55 instead of 10:00) in comparison with the current clock count assigned to transaction requests generated by processor 23 in computer site 2.

Under these circumstances, there are four possible orders in which transactions T1 and T2 can be generated, and in which a data entry in the database of computer site 3 can be accessed while performing transactions T1 and T2:

(1) The actual time at which transaction T1 is generated by processor 13 in computer site 1 is before the actual time at which transaction T2 is generated by processor 23 in computer site 2; and the data entry in the database of computer site 3 is accessed during transaction T1 before the data entry is accessed during transaction T2.

(2) The actual time at which transaction T1 is generated by processor 13 in computer site 1 is before the actual time at which transaction T2 is generated by processor 23 in computer site 2; and the data entry in the database of computer site 3 is accessed during transaction T2 before the data entry is accessed during transaction T1.

(3) The actual time at which transaction T2 is generated by processor 23 in computer site 2 is before the actual time at which transaction T1 is generated by processor 13 in computer site 1; and the data entry in the database of computer site 3 is accessed during transaction T1 before the data entry is accessed during transaction T2.

(4) The actual time at which transaction T2 is generated by processor 23 in computer site 2 is before the actual time at which transaction T1 is generated by processor 13 in computer site 1; and the data entry in the database of computer site 3 is accessed during transaction T2 before the data entry is accessed during transaction T1.

In the first two examples above, because the current clock count in computer site 1 is later than the current clock count in computer site 2, and because the actual time at which transaction T1 is generated by processor 13 is before the actual time at which transaction T2 is generated by processor 23, the timestamp $t_s$ (T1) assigned to transaction T1 will be earlier than the timestamp $t_s$ (T2) assigned to transaction T2.

In a preferred embodiment of the invention, a processor in a first computer site will execute a new transaction, at times when the timestamp assigned to the new transaction is larger than the timestamp corresponding to the record key. Therefore, in the first example, processor 23 in computer site 2 executes a READ operation during transaction T2.

In accordance with the invention, a processor in a first computer site will abort a new transaction, at times when the timestamp assigned to the new transaction is smaller than record key the timestamp corresponding to the data. Therefore, in the second example, processor 13 in computer site 1 aborts transaction T1.

In the third and fourth examples above, even though the timestamp assigned to transaction requests generated by processor 13 is smaller than the timestamp assigned to transaction requests generated by processor 23, if the difference in the actual times at which the transactions are generated is greater than the difference in timestamps, then the timestamp $t_s$ (T2) assigned to transaction T2 will be smaller than the timestamp $t_s$(T1) assigned to transaction T1.

Therefore, in the third example, processor 23 in computer site 2 aborts transaction T2. In the fourth example, processor 13 in computer site 1 executes a READ operation during transaction T1.

On the other hand, the timestamp $t_s$ (T1) assigned to transaction T1 will be smaller than the timestamp $t_s$(T2) assigned to transaction T2 if the difference in the actual times at which the transactions are generated is smaller than the disparity in timestamps.

Under these circumstances, in the third example, processor 23 in computer site 2 executes a READ operation during transaction T2. In the fourth example, processor 13 in computer site 1 aborts transaction T1.

In accordance with the invention, a processor in a first computer site will change the abort count corresponding to the first computer site, at times when a new transaction is aborted, to indicate the number of times that new transactions initiated by the first computer site have been aborted. Preferably, the abort count for computer site 1 is stored in abort register 14. The abort counts corresponding to computer sites 1, 2, and 3 are continually updated by processors 13, 23, and 33 by the incrementing of the abort counts stored in abort registers 14, 24, and 34, respectively, whenever processors 13, 23, and 33 abort a transaction.

The probability that transaction T1 will be aborted is larger than the probability that transaction T2 will be aborted in the examples above because the current clock count of the timestamp assigned to transaction requests generated by processor 13 is late or delayed (e.g., 9:55 instead of 10:00) in comparison with the current clock count of the timestamp assigned to transaction requests generated by processor 23. As a result, a larger number of transactions will be aborted by computer sites that have a clock and/or clock register that are late when compared with the clocks and clock registers for the other computer sites in the system.

In the present invention, the current clock counts in a distributed computer system are adjusted. In accordance with the invention, a processor in a first computer site accesses an abort count corresponding to a second computer site. The processor then compares the abort count corresponding to the first computer site with the abort count corresponding to the second computer site. At times when the comparison between the abort counts in the first and second computer sites indicates that new transactions have been aborted more frequently in one of the two computer sites, the processor changes the current clock count corresponding to the first computer site to more closely match the current clock count corresponding to the second computer site.

Preferably, the computer sites recurrently executes the steps required to adjust their current clock counts. For example, a processor may perform these steps after it has not executed any transactions for a predetermined time. Alternatively, a user clock matching request can be entered at a computer site using the corresponding input device, and the computer site then executes the steps required to adjust current clock counts in response to entry of the user clock matching request.

Figure 9A:
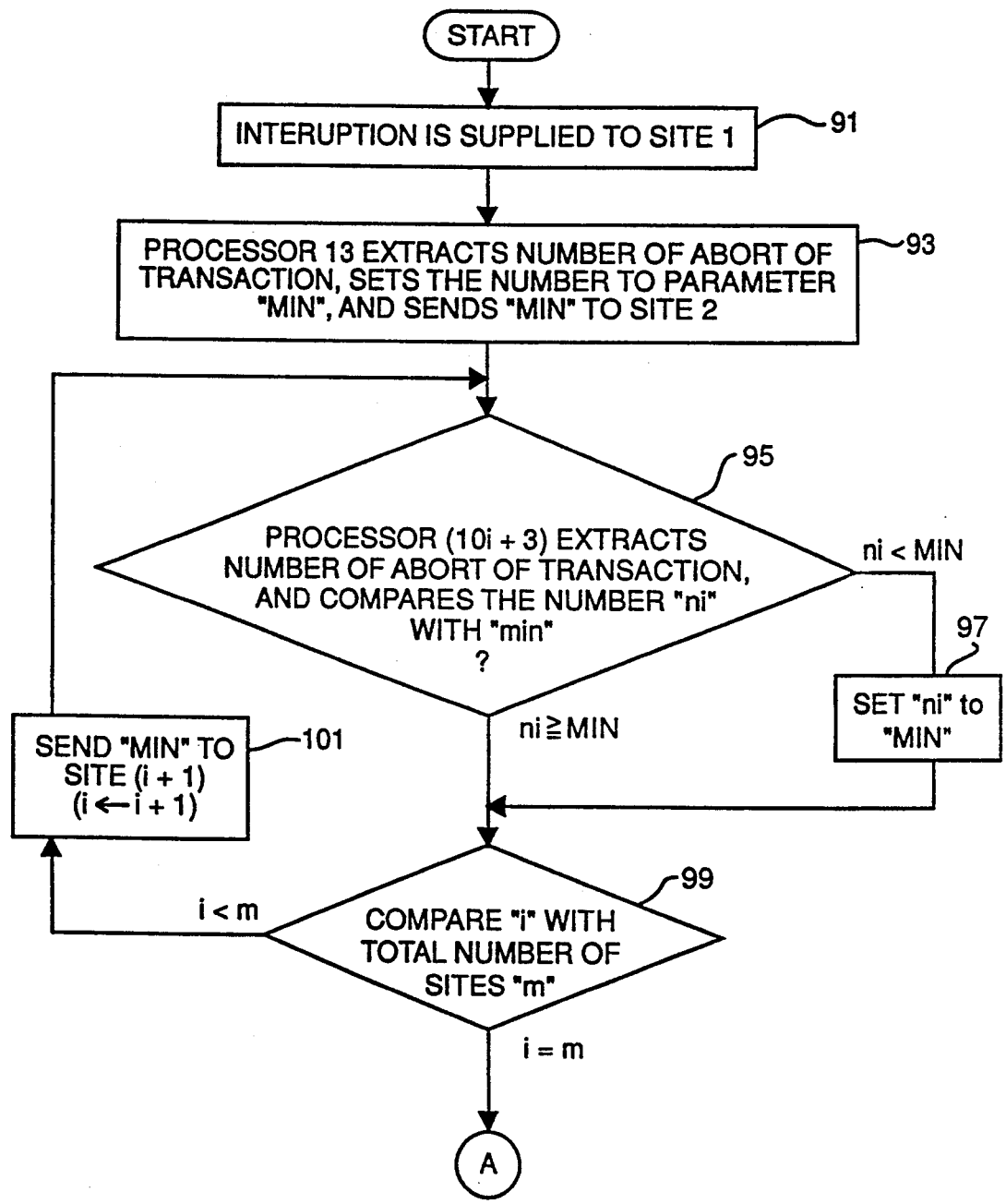
FIGS. 9A and 9B show a flow chart of a method for adjusting current clock counts in a distributed computer system.
Figure 9B:
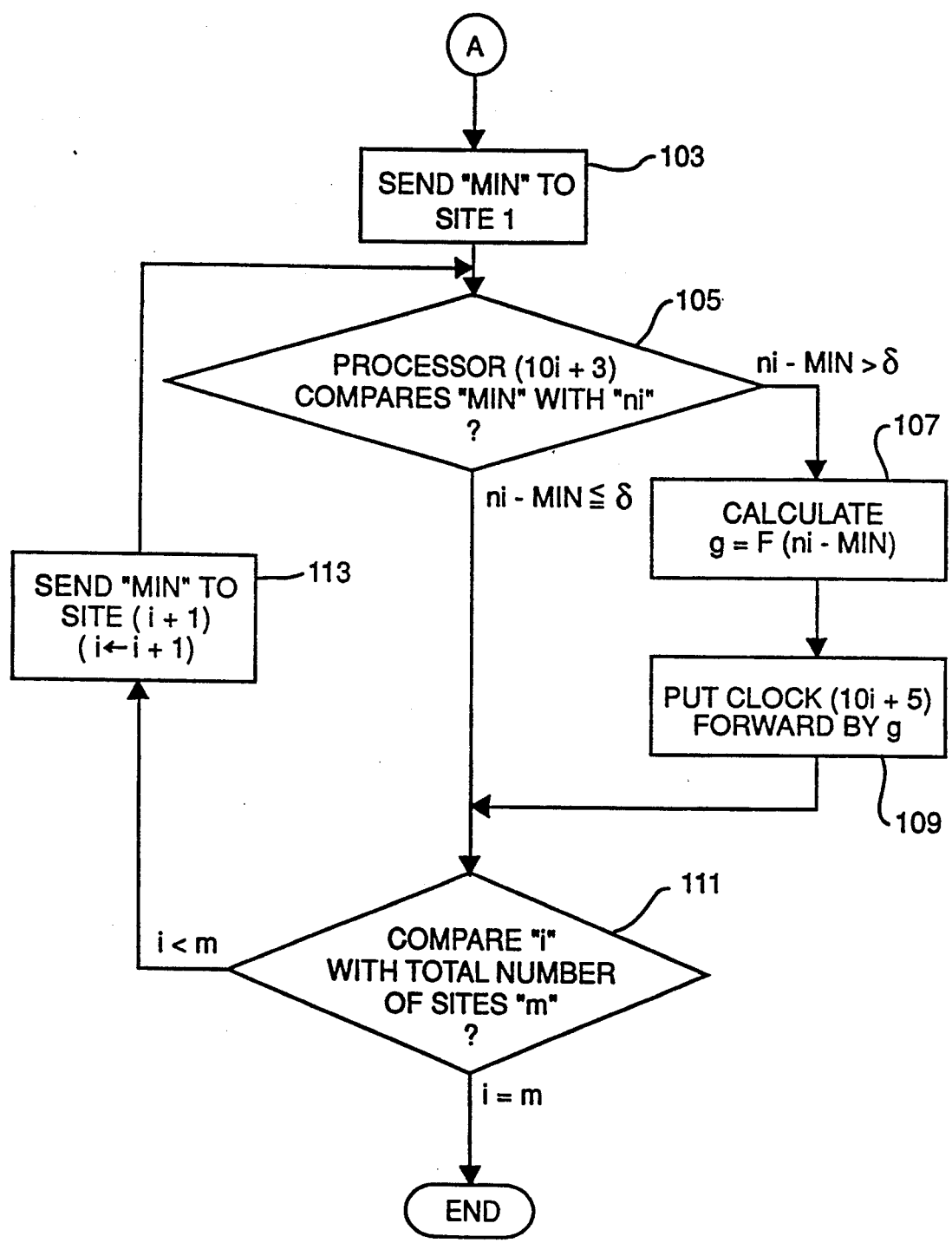

FIG. 9A and 9B are a flow chart showing a preferred embodiment of a method for adjusting current clock counts in a distributed computer system.

First, an interruption is supplied to processor 13 in computer site 1 in step 91. In step 93, processor 13 determines the number of times it has aborted a new transaction by reading abort register 14 in computer site 1. Then, in step 93, processor 13 temporarily defines the parameter MIN as equal to n1, the number of transactions aborted by processor 13. The parameter MIN is then sent to the next site, i.e., computer site 2. Generally speaking, the parameter MIN will represent the minimum number of transactions that have been aborted by a single one of the computer sites in the distributed computer system.

At step 95, processor 23 determines the number of times (n2) it has aborted a new transaction by reading abort register 24 in computer site 2. Processor 23 then compares n2 with MIN. If the number n2 of transactions aborted by processor 23 is smaller than the value of MIN received by processor 23 from computer site 1, then processor 23 in step 97 changes the value of MIN to equal n2, the number of transactions aborted by processor 23.

During step 99, the identifier of the computer site that most recently received and processed the parameter MIN is compared with total number of computer sites (m) to determine if all computer sites in the computer system have had an opportunity to update the value of MIN. If some computer sites still have not received the parameter MIN for processing, the current processor (e.g., processor 23) sends the parameter MIN to the next site, i.e., computer site 3, in step 101.

After each computer site has received and processed the parameter MIN, the current processor (e.g., processor 33) sends the parameter MIN back to the original computer site, e.g., computer site i, in step 103. At step 105, processor i3 in computer site i compares the number in of transactions aborted by it with the parameter MIN, which now corresponds to the minimum number of transactions that have been aborted by any single the computer site in the distributed computer system.

If the difference between the number ni of transactions aborted by processor i3 is larger than the value of MIN by at least a threshold value $\delta$, a parameter g is calculated in step 107. The value of g is a function of the size of the difference between ni and MIN. In step 109, processor i3 in computer site i moves its current clock count forward by an amount equal to the value of g.

At step 111, processor i3 in computer site i determines whether all of the computer sites in the system have had an opportunity to adjust their current clock counts If not all of the computer sites have executed step 105, the parameter MIN is then sent to the processor in one of these other computer sites in step 113. After all computer sites have executed step 105, the process for adjusting current clock counts has been completed.

In the preferred embodiment of the invention, abort counts are stored in abort registers 14, 24, and 34. In another embodiment, the abort registers can be replaced by succeed registers that store succeed counts.

In this second embodiment, a processor in a first computer site will change the succeed count corresponding to the first computer site, at times when a new transaction is not aborted, to indicate the number of times that new transactions initiated by the first computer site have been successfully completed. The succeed counts corresponding to computer sites 1, 2, and 3 would be continually updated by processors 13, 23, and 33 by the incrementing of the succeed counts stored in the succeed registers whenever processors 13, 23, and 33 successfully complete a transaction.

In the second embodiment, a processor in a first computer site accesses an succeed count corresponding to a second computer site. The processor then compares the succeed count corresponding to the first computer site with the succeed count corresponding to the second computer site. At times when the comparison between the succeed counts in the first and second computer sites indicates that new transactions have been successfully completed more frequently in one of the two computer sites, the processor changes the current clock count corresponding to the first computer site to more closely match the current clock count corresponding to the second computer site.

In the second embodiment, a process similar to that shown in FIGS. 9A and 9B is carried out, but instead of the parameter MIN, a parameter MAX is defined that will represent the maximum number of transactions that have been successfully completed by a single one of the computer sites in the distributed computer system. The value of g for this embodiment is a function of the size of the difference between ni, the number of transactions succeeded by processor i3, and MAX. Processor i3 in computer site i will move its current clock count forward by an amount equal to the value of g at times when the difference between ni and MAX is larger than a threshold value of δ.

Preferably, processor i3 in computer site i will clear its abort count or succeed count whenever processor i3 has just adjusted its current clock count. In this case, the difference in the value of the abort or succeed counts between various computer sites will more directly reflect the amount of adjustment that must be made in current clock counts.

The function used to calculate g is represented as a (constant)×(average generation interval for transaction requests)×(ni−MIN)/MIN. The term (ni−MIN)/MIN serves to dynamically change the current clock count in a computer site which has a large number of abort of transaction. The use of the average generation intervals for transaction requests serves to change current clock counts in proportion to the average generation interval, i.e., if this average is short, it indicates that many transactions are being executed at almost the same time. Therefore, it is necessary for current clock counts to change minutely. The constant used to calculate g should be less than one, in order to gradually improve any unbalance in transaction processing of each computer site.

What is claimed is:

1. A method for adjusting current clock counts in a distributed computer system, wherein the distributed computer system includes a plurality of computer sites, each computer site including a processor, a memory having a plurality of record keys for storing a timestamp table, a database, abort register means for storing an abort count corresponding to the computer site, clock means for generating a clock signal indicating passage of time, and clock resister means responsive to the clock signal for storing a current clock count corresponding to the computer site, wherein the database for each computer site including a plurality of data entries that correspond to the plurality of record keys and that are accessed by a processor, wherein each record key corresponds to a timestamp which includes at least a clock count that indicates when a data entry corresponding to the record key was most recently accessed, wherein the distributed computer system includes network means for interconnecting the plurality of computer sites to enable a processor in one computer site to send data entries and requests for data entry accessing to another computer site, and wherein the following steps are executed by a processor in at least a first one of the computer sites;

asigning to a new transaction a timestamp related to the current clock count for the first computer site, at times when the processor in the first one of the computer sites is initiating the new transaction;

reading the timestamp corresponding to the record key from the memory, at times when the processor in the first computer site is initiating the new transaction;

comparing an existing timestamp corresponding to the record key with the timestamp assigned to the new transaction;

aborting the new transaction, at times when the timestamp assigned to the new transaction is smaller than the existing timestamp corresponding to the record key;

incrementing an abort count corresponding to the first computer site, at times when the new transaction is aborted, to indicate the number of times that new transactions initiated by the first computer site have been aborted;

accessing an abort count in a second computer site corresponding to new transactions aborted in the second computer site;

comparing the abort count corresponding to the first computer site with the abort count corresponding to the second computer site; and changing the current clock count corresponding to the first computer site to more closely match the current clock count corresponding to the second computer site, at times when the comparison between the abort counts in the first and second computer sites indicates the new transactions have been aborted more frequently in one of the two computer sites.

2. A method in accordance with claim 1, in which:

the step of changing the current clock count comprises changing current clock count by an amount that is proportional to the difference between a number of times that new transactions have been aborted in the two computer sites.

3. A method in accordance with claim 1, and further comprising:

changing the abort count corresponding to the first computer site to more closely match the abort count corresponding to the second computer site, at times when the current clock count corresponding to the first computer site is changed to more closely match the current clock count corresponding to the second computer site.

4. A method in accordance with claim 1, in which:

the step of changing the current clock count comprises changing the current clock count only if the number of new transactions aborted in the first computer site exceeds the number of new transactions aborted in the second computer site.

5. A method in accordance with claim 1, in which:

the step of changing the current clock count comprises changing the current clock count only if the number of new transactions aborted in the first computer site exceeds the number of new transactions aborted in the second computer site by a threshold amount.

6. A method in accordance with claim 1, and further comprising:

entering a new read clock count into the timestamp corresponding to the record key to indicate when the corresponding data entry was accessed by the processor, wherein the new read clock count is related to the current clock count corresponding to first computer site.

7. A method in accordance with claim 6, wherein each timestamp includes, for each read clock count, an identifier that indicates which processor accessed the corresponding data entry in the corresponding record key, and further comprising:

entering an identifier into the timestamp corresponding to the record key to indicate that the corresponding data entry was accessed by the processor in the first computer site, at times when a new read clock count is entered into the timestamp.

8. A method in accordance with claim 1, in which the first computer site recurrently executes the steps of accessing the abort count for the second computer site, comparing the abort count for the first computer site with the abort count for the second computer site, and changing the current clock count for the first computer site to more closely match the current clock count for the second computer site.

9. A method in accordance with claim 1, in which the first computer site includes input means for entering a user clock matching request, and in which the first computer site executes the steps of accessing the abort count for the second computer site, comparing the abort count for the first computer site with the abort count for the second computer site, and changing the current clock count for the first computer site to more closely match the current clock count for the second computer site, in response to entry of a user clock matching request.

10. A method for adjusting current clock counts in a distributed computer system, wherein the distributed computer system includes a plurality of computer sites, each computer site including a processor, a memory having a plurality of record keys for storing a timestamp table, a database, succeed register means for storing an succeed count corresponding to the computer site, clock means for generating a click signal indicating passage of time, and clock register means responsive to the clock signal for storing a current clock count corresponding to the computer site, wherein the database for each computer site includes a plurality of data entries that correspond to the plurality of record keys and that are accessed by a processor, wherein each record key corresponds to a timestamp which includes at least a clock count that indicates when a data entry corresponding to the record key was most recently accessed, wherein the distributed computer system includes network means for interconnecting the plurality of computer sites to enable a processor in one computer site to send data entries and requests for data entry accessing to another computer site, and wherein the following steps are executed by a processor in at least a first one of the computer sites:

assigning to a new transaction a timestamp related to the current clock count for the first computer site, at times when the processor in the first one of the computer sites is initiating the new transaction;

reading the timestamp corresponding to the record key from the memory, at times when the processor in the first computer site is initiating the new transaction;

comparing an existing timestamp corresponding to the record key with the timestamp assigned to the new transactional aborting the new transaction, at times when the timestamp assigned to the new transaction is smaller than the existing timestamp corresponding to the record key;

incrementing a succeed count corresponding to the first computer site, at times when the new transaction is not aborted, to indicate the number of times that new transactions initiated by the first computer site have been successfully completed;

accessing a succeed count in a second computer site corresponding to new transactions not aborted in the second computer site;

comparing the succeed count corresponding to the first computer site with the succeed count corresponding to the second computer site; and changing the current clock count corresponding to the first computer site to more closely match the current clock count corresponding to the second computer site, at times when the comparison between the second counts in the first and second computer sites indicates that new transactions have been successfully completed more frequently in one of the two computer sites.

11. A method in accordance with claim 10, in which:
the step of changing the current clock count comprises changing the current clock count by an amount that is proportional to the difference between a number of times that new transactions have been successfully completed in the two computer sites.

12. A method in accordance with claim 10, and further comprising:
changing the succeed count corresponding to the first computer site to more closely match the succeed count corresponding to the second computer site, at times when the current clock count corresponding to the first computer site is changed to more closely match the current clock count corresponding to the second computer site.

13. A method in accordance with claim 10, in which:
the step of changing the current clock count comprises changing the current clock count only if the number of new transactions successfully completed in the first computer site exceeds the number of new transactions successfully completed in the second computer site.

14. A method in accordance with claim 10, in which:
the step of changing the current clock count comprises changing the current clock count only if the number of new transactions successfully completed in the first computer site exceeds the number of new transactions successfully completed in the second computer site by a threshold amount.

15. A method in accordance with claim 10, and further comprising:
entering a new read clock count into the timestamp corresponding to the record key to indicate when the corresponding data entry was accessed by the processor, wherein the new read clock count is related to the current clock count corresponding to the first computer site.

16. A method in accordance with claim 10, wherein each timestamp includes, for each read clock, an identifier that indicates which processor accessed the corresponding data entry in the corresponding record key, and further comprising:
entering an identifier into the timestamp corresponding to the record key to indicate that the corresponding data entry was accessed by the processor in the first computer site, at times when a new read clock count is entered into the timestamp.

17. A method in accordance with claim 10, in which the first computer site recurrently executes the steps of accessing the succeed count for the second computer site, comparing the succeed count for the first computer site with the succeed count for the second computer site, and changing the current clock count for the first computer site to more closely match the current clock count for the second computer site.

18. A method in accordance with claim 10, in which the first computer site includes input means for entering a user clock matching request, and in which the first computer site executes the steps of accessing the succeed count for the second computer site, comparing the succeed count for the first computer site with the succeed count for the second computer site, and changing the current clock count for the first computer site to more closely match the current clock count for the second computer site, in response to entry of a user clock matching request.

* * * * *

UNITED STATES PATENT AND TRADEMARK OFFICE
CERTIFICATE OF CORRECTION

PATENT NO. : 5,293,627
DATED : March 8, 1994
INVENTOR(S) : Nobuhiro Kato et al.

It is certified that error appears in the above-indentified patent and that said Letters Patent is hereby corrected as shown below:

On the title page: Item [54] and Column 1, line 1, line 1, change "CURENT" to --CURRENT--.

Abstract, Front Page, line 5, change "tion" to --tions--.

Claim 1, column 11, line 38, change "times" to --time--.

Claim 1, column 11, line 39, change "tamp" to --stamp--.

Claim 1, column 11, line 45, change "including" to --includes--.

Claim 1, columnn 11, line 58, change "asigning" to --assigning--.

Claim 10, column 13, line 28, change "an" to --a--.

UNITED STATES PATENT AND TRADEMARK OFFICE
CERTIFICATE OF CORRECTION

PATENT NO. : 5,293,627
DATED : March 8, 1994
INVENTOR(S) : Nobuhiro Kato et al.

It is certified that error appears in the above-indentified patent and that said Letters Patent is hereby corrected as shown below:

Claim 10, columnn 13, line 29, change "click" to --clock--.

Claim 10, column 13, line 56, change "transactional" to --transaction--.

Signed and Sealed this

Tenth Day of January, 1995

Attest:

BRUCE LEHMAN

Attesting Officer

Commissioner of Patents and Trademarks